(12) United States Patent
Kurokawa et al.

(10) Patent No.: US 7,558,178 B2
(45) Date of Patent: Jul. 7, 2009

(54) INFORMATION RECORDING/REPRODUCING METHOD AND INFORMATION RECORDING/REPRODUCING APPARATUS

(75) Inventors: Takahiro Kurokawa, Fujisawa (JP); Hiroyuki Minemura, Kokubunji (JP); Mariko Umeda, Fuchu (JP); Harukazu Miyamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 633 days.

(21) Appl. No.: 11/194,599

(22) Filed: Aug. 2, 2005

(65) Prior Publication Data

US 2006/0233070 A1   Oct. 19, 2006

(30) Foreign Application Priority Data

Apr. 15, 2005   (JP)   ............................. 2005-117757

(51) Int. Cl.
  *G11B 7/00*   (2006.01)
(52) U.S. Cl. ............................. 369/112.01; 369/112.02
(58) Field of Classification Search .............. 369/44.23, 369/44.24, 44.29, 44.32, 112.01, 112.23, 369/112.02, 112.03, 112.1
See application file for complete search history.

(56) References Cited

U.S. PATENT DOCUMENTS

| 6,628,582 B2* | 9/2003 | Furukawa ................ 369/44.32 |
| 6,771,584 B2* | 8/2004 | Yamanaka ............. 369/112.23 |
| 6,807,133 B2 | 10/2004 | Ariyoshi et al. |
| 6,826,133 B2 | 11/2004 | Ichimura et al. |
| 6,934,226 B2* | 8/2005 | Yasuda et al. ............. 369/44.23 |
| 7,065,013 B2* | 6/2006 | Yasuda et al. ............. 369/44.29 |
| 7,307,927 B2* | 12/2007 | Fujita et al. ............... 369/44.29 |
| 7,327,642 B2* | 2/2008 | Yamada et al. ........... 369/44.29 |
| 7,344,077 B2* | 3/2008 | Sagara et al. ................ 235/455 |
| 2003/0099168 A1 | 5/2003 | Ma et al. |
| 2003/0107961 A1 | 6/2003 | Yasuda et al. |

FOREIGN PATENT DOCUMENTS

| JP | 2001-307349 | 4/2000 |
| JP | 2002-367197 | 6/2001 |
| JP | 2004-171630 | 11/2002 |
| JP | 2004-241081 | 2/2003 |
| JP | 2004-241102 | 6/2003 |

* cited by examiner

*Primary Examiner*—Nabil Z Hindi
(74) *Attorney, Agent, or Firm*—Reed Smith LLP; Juan Carlos A. Marquez, Esq.

(57) ABSTRACT

The amount of focus offset and the amount of spherical aberration correction are adjusted with respect to a disk on which no data is recorded with high precision. The amount of focus offset and the amount of spherical aberration correction are adjusted on the basis of (1) a focus error signal amplitude, (2) a tracking error signal amplitude in a wide track pitch region, and (3) a rectangular waveform wobble signal envelop level.

5 Claims, 12 Drawing Sheets

INFORMATION RECORDING/REPRODUCING METHOD AND INFORMATION RECORDING/REPRODUCING APPARATUS

CLAIM OF PRIORITY

The present application claims priority from Japanese application JP 2005-117757 filed on Apr. 15, 2005, the content of which is hereby incorporated by reference into this application.

FIELD OF THE INVENTION

The present invention relates to an information recording reproducing method and an information recording reproducing device, which make it possible to an information recording reproducing system that records and reproduces information by irradiating a light.

BACKGROUND OF THE INVENTION

An optical disk that has been known as a CD or a DVD is supported by consumers as a random access information recording medium that is high in capacity and low in capacity, and widely spread. In recent years, a personal computer or an audio visual device has been sophisticated, and the amount of information that is dealt with by a user is remarkably increased. Under the above circumstances, the optical disk is demanded to provide higher capacity as the high capacity information recording medium.

Recording of information in the optical disk is conducted by irradiating a laser beam that has been modulated on the basis of record data on an information recording layer of the optical disk medium and then changing a state of the information recording layer due to a generated heat. On the other hand, the production of information is conducted by irradiating the laser beam on the information recording layer and then detecting a change in the reflectivity which is attributable to a change in the state of the information recording layer.

In the optical disk, information is recorded by changing the state of the information recording layer due to a heat that is produced by an optical spot formed by converging the laser beam on the recording medium. The information is reproduced by reading the change in the reflectivity which is caused by the change in the state with the optical spot. For that reason, the information recording density of the optical disk can be improved by lessening the size of the optical spot, thereby making it possible to increase the recording capacity per one disk. There has been known that the diameter of the optical spot which is formed on the information recording layer is proportional to $\lambda/NA$ when it I assumed that the wavelength of the laser beam is $\lambda$, and the numerical aperture of the objective lens is NA. For that reason, shortening wavelength of the laser beam and increasing numerical aperture of the objective lens are effective to improve in the information recording density of the optical disk.

In recent years, there has been developed a high-density optical disk having a recording capacity of about 25 GB per information recording layer by a technique in which the optical spot is lessened by using a blue semiconductor laser of $\lambda=405$ nm and an objective lens of NA=0.85 instead of a red semiconductor laser of $\lambda=650$ nm and an objective lens of NA=0.6 used in the DVD (recording capacity=4.7 GB per information recording layer).

However, an increase in the NA of the objective lens in order to increase the recording density leads to a problem of a distortion of the optical spot due to the spherical aberration. Because the spherical aberration is approximately proportional to $NA^4$, the optical disk system using the objective lens of the high NA generates a large spherical aberration with respect to a slight error of a cover layer thickness, to thereby remarkably deteriorate the quality of a readout signal.

As a standard that has been frequently employed, it is necessary to suppress an RMS wave front aberration within 0.07 $\lambda$rms in order to reproduce the information without any error. According to this standard, it is necessary to suppress an error in the cover layer thickness of the disk within about ±4 μm. For that reason, it is necessary to control the thickness of the cover layer with a high precision in the disk manufacturing process, and there arises such a problem that the manufacturing costs cannot be suppressed.

For that reason, in the optical disk system using the objective lens of the high NA, it not enough to adjust the amount of focus offset in order to adjust the focus position to the information recording layer. Also, it is essential to provide a means for reducing the spherical aberration according to the error in the cover layer thickness in each of the disks.

As a technique for reducing the spherical aberration, there has been used a technique in which a spherical aberration correcting means is disposed in an optical path of the laser beam, the spherical aberration of a predetermined amount is added to the optical flux that passes through the spherical aberration correcting means in advance with the result that the spherical aberration generated by an error of the disk cover layer thickness when the laser beam is converged on the recording layer by the objective lens and the spherical aberration that has been added by the spherical aberration connecting means in advance cancel each other. As the spherical aberration correcting means that is used in this example, there has been known (1) a spherical aberration correcting means that is made up of two groups of objective lenses and changes a distance between the respective objective lenses by an actuator, and (2) a spherical aberration correcting means that is made up of a liquid crystal element that has been divided into plural regions and controls the refractive indexes of the respective regions by applying a voltage. For example, those spherical aberration correcting means are disclosed in, for example, JP-A 11388/2000 and JP-A 222838/2001.

There are various known examples as an index for determining a spherical aberration amount to be added in advance. For example, in a technique that is disclosed in JP-A No. 11388/2000, the adjustment of the focus offset amount and the spherical aberration correction amount is implemented by a change in the amplitude of a readout signal (RF signal) obtained when reproducing data that has been recorded in an optical disk. However, there has arisen such a problem that the adjustment of the focus offset amount and the spherical aberration correction amount could not be implemented with respect to an unrecorded disk in which no data is recorded (there is no recording mark) because the readout signal is not obtained even if the amount of focus offset and the amount of spherical aberration correction are going to be optimized.

Also, in a technique that is disclosed in JP-A No. 222838/2001, it is necessary to record any data on an information recording layer of the optical disk because the adjustment of the amount of focus offset and the amount of spherical aberration correction is implemented by using the amplitude of the readout signal of data, or both of the amplitude of the readout signal of the data and the amplitude of the tracking error signal. In other words, necessary readout signal cannot be obtained in the optical disk on which data is not recorded at all, resulting in such a problem that the adjustment of the spherical aberration correction amount cannot be implemented.

As techniques for solving the above problem, there have been known techniques by which the amount of focus offset and the amount of spherical aberration correction are adjusted on the basis of the tracking error signal or the wobble signal which can be acquired even from the unrecorded disk. Those techniques are disclosed in, for example, JP-A No. 233917/2003, JP-A No. 168225/2003, JP-A No. 171630/2004, JP-A No. 241081/2004, and JP-A No. 241102/2004.

The tracking error signal is produced by the positional replacement of the light spot from the center line of the track, and detected as a differential signal of the respective outputs of photodetectors that have been divided into two in the radius direction of the disk. The tracking error signal becomes zero (0) in the case where the. center of the light spot is positioned on the central line of the track, and takes the maximum absolute value in the case where the center of the light spot is positioned at an end of the track. The amplitude of the tracking error signal is a difference between the maximum and the minimum of the tracking error signals.

Also, the wobble means the fine slide of the track in the radius direction, and in general, the frequency, the phase, or the amplitude is modulated on the basis of data such as address information for specifying the position of the track on the disk. A method of detecting the wobble signal is basically identical with that of the tracking error signal. In the case where the repetition frequency of the wobble is sufficiently larger than the frequency band of the tracking, the light spot cannot follow the wobble, and the slide is detected as the tracking error signal.

SUMMARY OF THE INVENTION

However, when the amount of focus offset and the amount of spherical aberration correction are adjusted on the basis of the amplitude of the tracking error signal or the amplitude of the wobble signal, there arises such a problem that an excellent precision in the aberration correction cannot be obtained. The reason is stated below.

FIG. 3 is a diagram showing a contour of the tracking error signal amplitudes that is calculated while the amount of focus offset and the amount of spherical aberration correction are changed with the use of an optical diffraction simulator. The amplitude of the tracking error signal is normalized by the maximum of the tracking error signal amplitude (a value when the amount of focus offset=0, and the amount of spherical aberration correction=0). The calculation condition used in the optical diffraction simulation is indicated by Table 1.

TABLE 1

Calculation condition in optical diffraction simulation

| Laser wavelength | 405 nm |
| Objective lens NA | 0.85 |
| Refractive index of disk cover layer | 1.56 |
| Thickness of disk cover layer | 100 μm |
| Track pitch | 0.32 μm |
| Width of track groove | 0.16 μm |
| Depth of track groove | 40.5 nm |

In this example, positive signs that the position of a focal point is located in front of the information recording layer viewed from the light incident side, and negative signs that the position of the focal point is located in the rear of the information recording layer. Also, the signs of the amount of spherical aberration correction are defined in such a manner that the positive corresponds to a state in which the thickness of the disk cover layer is thicker than an ideal value, and the negative corresponds to a state in which the thickness of the disk cover layer is thinner than the ideal value. It is understood from FIG. 3 that a change in the amplitude of the tracking error signal is very small in a direction where the symbols of the amount of focus offset and the amount of spherical aberration correction are different from each other.

In this example, let us consider that the adjustment of the amount of focus offset and the amount of spherical aberration correction is implemented so that the amplitude of the tracking error signal becomes the maximum. The adjustment error of the amount of spherical aberration correction becomes ±10 μm or more when it is assumed that the amount of focus offset and the amount of spherical aberration correction can be adjusted. For that reason, even if the amount of focus offset and the amount of spherical aberration correction are adjusted on the basis of the amplitude of the tracking error signal, there is the possibility that the readout signal quality cannot reach an excellent condition (the center of FIG. 3), and a large aberration remains.

The reason that the change in the amplitude of the tracking error signal becomes small with respect to a change in the amount of focus offset and the amount of spherical aberration correction in a specific direction is stated below.

FIG. 4 is a diagraph showing plots of the light slot intensity distributions in the radius direction of the disk which are calculated with respect to the condition I and the condition II in FIG. 3, respectively. The calculation condition is identical with that in Table 1.

Condition (I): The amount of focus offset=0, and the amount of spherical aberration correction=0 (no aberration); and Condition (II): The amount of focus offset=0.4 μm, and the amount of spherical aberration correction=−7 μm When the condition changes from the condition (I) to the condition (II), the light intensity of a main lobe of the light spot on the information recording layer is gradually deteriorated. As a result, the main lobe component of the tracking error signal is reduced. However, the light intensity of a side lobe (first diffraction ring) which is produced in the form of a ring band around the main lobe is increased contrarily. A position at which the side lobe is generated is apart from the center of the main lobe by substantially the same distance as the track pitch (apart from the center of the main lobe by about 0.35 μm). As a result, an increase in the light intensity of the side lobe acts so as to cancel the deterioration of the light intensity of the main lobe, to thereby suppress a decrease in the amplitude of the tracking error signal. This is a factor for reduce a change of the amplitude of the tracking error signal with respect to a change in the amount of focus offset and the amount of spherical aberration correction in a specific direction.

Since the wobble signal is fundamentally identical with the tracking error signal, the above phenomenon is similarly applied to the wobble signal.

As described above, when the amount of focus offset and the amount of spherical aberration correction are adjusted on the basis of the width of the tracking error signal and the width of the wobble signal, a sufficient adjustment precision cannot be obtained. As a result, there is a fear that the quality of the readout signal is not converged to an excellent condition, thereby making it difficult to reproduce the information without any error.

In addition, because the above problem adversely affects not only the quality of the readout signal but also the recording quality, the quality of the readout signal that is obtained from the recording mark is deteriorated with the result that the adjustment cannot be shifted to a fine adjustment of the amount of focus offset and the amount of spherical aberration correction on the basis of the quality of the readout signal.

In view of the above problems, an object of the present invention is to provide means for adjusting the amount of focus offset and amount of spherical aberration correction with a high precision by supplying a readout signal quality evaluation index sensitive to a change in the wave front aberration of a light spot.

The present invention implements the adjustments of the amount of focus offset and the amount of spherical aberration correction on the basis of the following three kinds of readout signal evaluation indexes.

(1) Focus error signal (S-curve signal) amplitude (2) Tracking error signal amplitude in a wide track pitch region (3) Rectangular waveform wobble signal envelop level That is, an information recording/reproducing apparatus using the readout signal evaluation index (1) according to the present invention comprises: an optical disk driver unit that rotationally drives an optical disk while holding the optical disk; a laser source; a spherical aberration correction unit that adds the spherical aberration of a variable to a laser beam that is generated from the laser source; an objective lens that converges the laser beam added with the spherical aberration on the optical disk that is rotationally held by the optical disk driving section; a photodetector that receives the laser beam that is reflected by the optical disk; a focus error signal generator unit that generates a focus error signal from an output of the photodetector; an actuator that drives the objective lens in a disk rotational axial direction; and a control unit that receives the focus error signal, and controls the amount of spherical aberration added by the spherical aberration correction unit and the amount of driving by the actuator, wherein the control unit controls the spherical aberration correction unit so that the amplitude of the focus error signal becomes maximum.

An information recording/reproducing apparatus using the readout signal evaluation index (2) according to the present invention comprises: an optical disk driver unit that holds and rotationally drives an optical disk; a laser source; a spherical aberration correction unit that adds the spherical aberration of a variable to a laser beam that is generated from the laser source; an objective lens that converges the laser beam added with the spherical aberration on the optical disk that is rotationally held by the optical disk driving section; a photodetector that receives the laser beam that is reflected by the optical disk; a focus error signal generator unit that generates a focus error signal from an output of the photodetector; a tracking error signal generator unit that generates a tracking error signal from the output of the photodetector; an actuator that drives the objective lens in a disk rotational axial direction; and a control unit that receives the focus error signal and the tracking error signal, and controls the amount of spherical aberration added by the spherical aberration correction unit and the amount of driving by the actuator, wherein the control unit controls the spherical aberration correction unit and the actuator so that the amplitude of the tracking error signal becomes maximum in a wide track pitch region having a track pitch TP that satisfies the following expression when it is assumed that a wavelength of the laser beam is $\lambda$ and a numerical aperture of the objective lens is NA:

$$1.12 = \lambda/NA \leq TP \leq 100 \ \mu m.$$

An information recording/reproducing apparatus using the readout signal evaluation index (3) according to the present invention comprises: an optical disk driver unit that holds and rotationally drives an optical disk; a laser source; a spherical aberration correction unit that adds the spherical aberration of a variable to a laser beam that is generated from the laser source; an objective lens that converges the laser beam added with the spherical aberration on the optical disk that is rotationally held by the optical disk driving section; a photodetector that receives the laser beam that is reflected by the optical disk; a focus error signal generator unit that generates a focus error signal from an output of the photodetector; a tracking error signal generator unit that generates a tracking error signal from the output of the photodetector; an envelop detector unit that detects an envelop level of a wobble signal included in the tracking error signal; an actuator that drives the objective lens in a disk rotational axial direction; and a control unit that receives the focus error signal and the tracking error signal, and controls the amount of spherical aberration added by the spherical aberration correction unit and the amount of driving by the actuator, wherein the control unit controls the spherical aberration correction unit and the actuator so that an envelop level of the wobble signal becomes maximum in a rectangular waveform wobble region where a configuration of the wobble is shaped in a rectangular wave.

According to the present invention, the reliability of recording and reproducing the information can be improved because the optimum amount of focus offset and the optimum amount of spherical aberration correction can be determined with respect to an unrecorded disk, that is, a disk that has no recording mark and cannot adjust the amount of focus offset and the amount of spherical aberration correction on the basis of the readout signal.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of the respective readout signal evaluation indexes according to the present invention.

Figure 5:
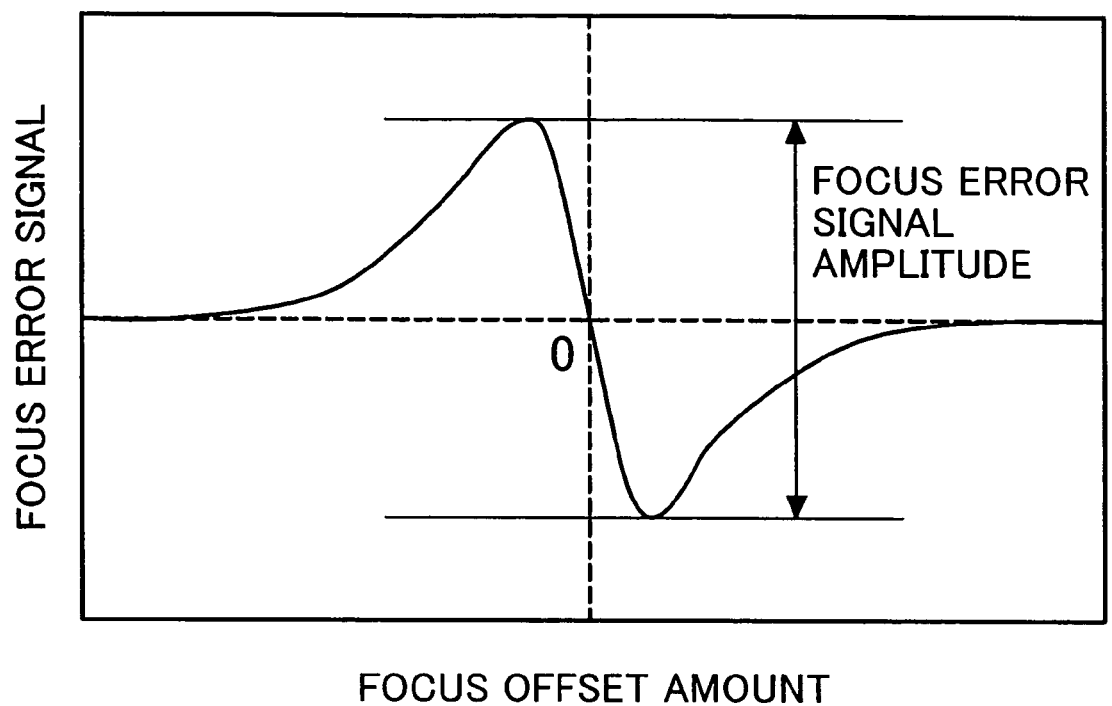
FIG. 5 is a graph showing a relationship between the amount of focus offset and the amplitude of focus error signal.

(1) Adjustment of the amount of spherical aberration correction based on a focus error signal (S-curve signal) amplitude:

In the present invention, an attention is paid to a tracking error signal and a wobble signal as well as a focus error signal (S-curve signal) as a signal that can be acquired from an unrecorded disk. A focus error signal is produced by the displacement of a focal position with respect to an information recording layer. As a method of acquiring the focus error signal, there are a knife edge method, a spot size detecting method, and an astigmatism method. In this example, the astigmatism method will be described. A photodetector that detects a reflected light from an optical disk is divided into two pieces in a radius direction of the disk, and divided into two pieces in a track direction, that is, divided into four pieces. A cylindrical lens is arranged in front of the photodetector to condense a laser beam, a light spot on the photodetector becomes substantially circular when the light spot is just focused on the information recording layer of the disk. However, when the focal position is displaced toward a front side of the information recording layer, the light spot on the surface of the photodetector is extended in one diagonal direction of the four divided photodetectors. On the contrary, when the focal position is displaced toward the rear side of the information recording layer, the light spot is extended in another diagonal direction. As a result, a relationship between the amount of focus offset and the focus error signal is obtained as shown in FIG. 5. A difference between the maximum and the minimum of the focus error signal indicates the amplitude of the focus error signal.

In acquiring the focus error signal amplitude, since the focal position is changed with respect to the information recording layer, that is, the amount of focal offset is changed, only the amount of spherical aberration correction is adjusted on the basis of the focus error signal amplitude.

Figure 3:
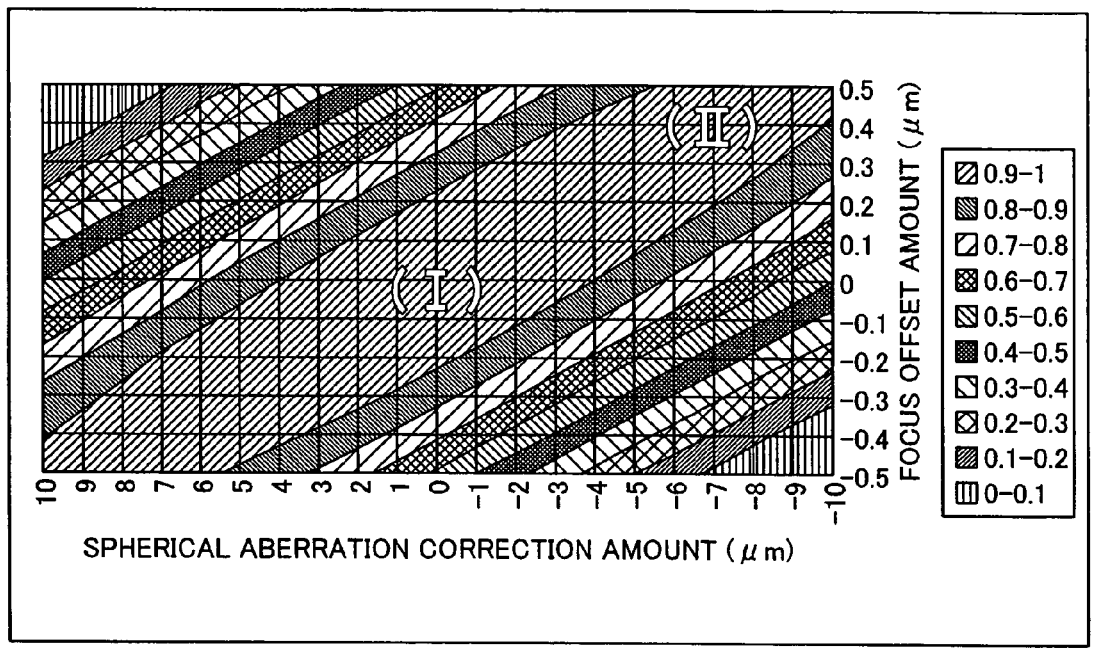
FIG. 3 is a diagram showing the contours of the tracking error signal amplitudes when the amount of focus offset and the amount of spherical aberration correction are changed.
Figure 4:
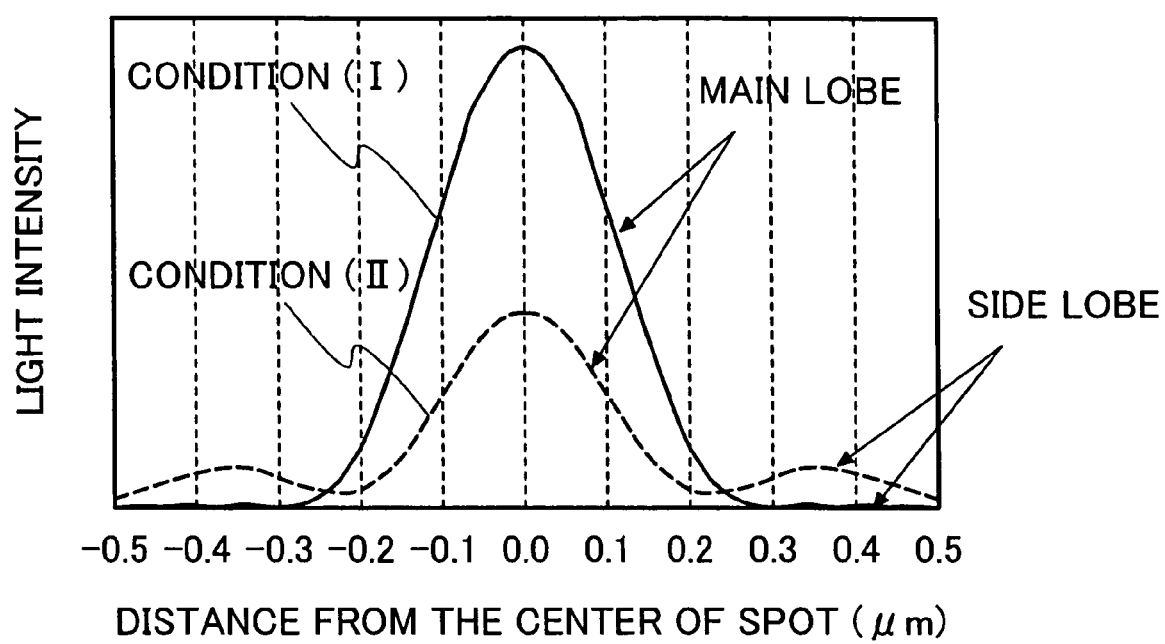
FIG. 4 is a graph showing the light intensity distributions of a light spot on an information recording layer in a disk radius direction under a condition (I) (the amount of focus offset=0, and the amount of spherical aberration correction=0) and a condition (II) (the amount of focus offset=0.4 μm, and the amount of spherical aberration correction=−7 μm) in FIG. 3, respectively.
Figure 6:
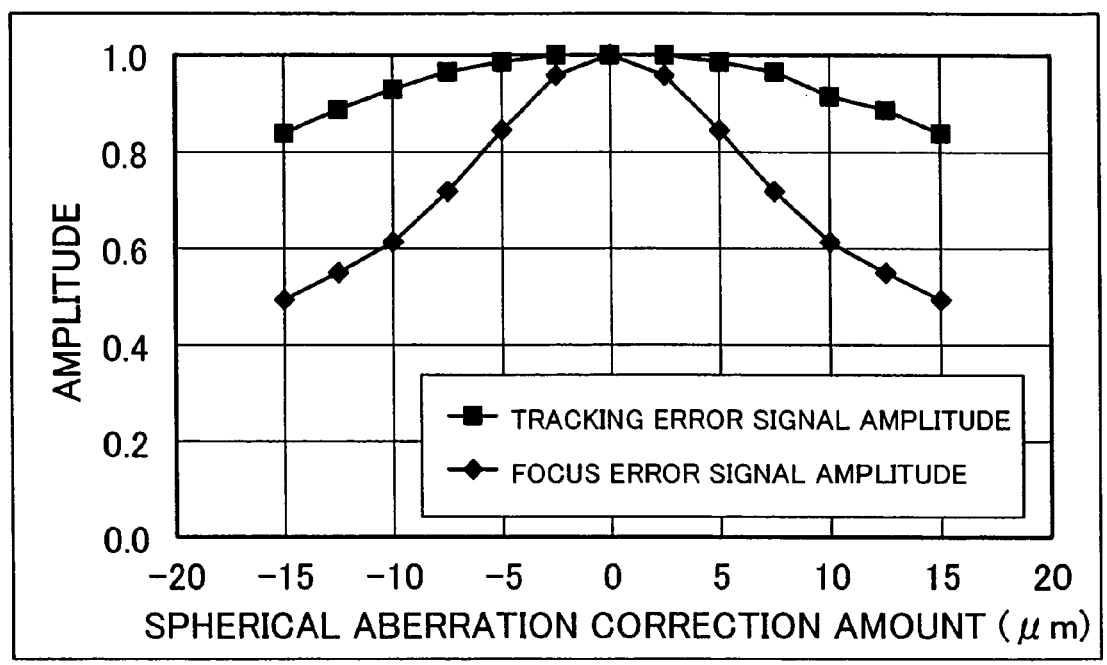
FIG. 6 is a graph showing a relationship between the amount of spherical aberration and the amplitude of focus error signal.

FIG. 6 shows the relationship between the amount of spherical aberration correction and the focus error signal amplitude which is calculated by an optical diffraction simulator and plotted. The calculation condition used in this example is identical with that in Table 1. In FIG. 6, a relationship between the amount of spherical aberration correction and the tracking error signal amplitude is also plotted. In this example, in changing the amount of spherical aberration correction, the amount of focus offset is changed so that the tracking error signal amplitude becomes maximum. That is, the condition is changed in a direction from (I) to (II) in FIG. 3.

With reference to FIG. 6, the focus error signal amplitude is precipitously changed with respect to a change in the amount of spherical aberration correction as compared with the tracking error signal amplitude. When the amount of spherical aberration correction is adjusted so that the tracking error signal amplitude becomes maximum, if the tracking error signal amplitude can be adjusted within a region that is 90% of the maximum or more taking an adjustment error into consideration, the amount of spherical aberration correction after the adjustment has been implemented can be suppressed within about ±10 μm or more. On the other hand, similarly, when the amount of spherical aberration correction is adjusted so that the focus error signal amplitude becomes maximum, the amount of spherical aberration correction after the adjustment has been implemented can be suppressed within about ±4 μm or more.

According to the above study, when the amount of spherical aberration correction is adjusted so that the focus error signal amplitude becomes maximum, the condition of the amount of spherical aberration correction under which the quality of the readout signal becomes excellent can be obtained with high precision.

(2) Adjustment of the amount of focus offset and the amount of spherical aberration correction based on the tracking error signal amplitude in a wide track pitch region:

As described above, the reason that a change in the tracking error signal amplitude is small with respect to a change in the amount of focus offset and the amount of spherical aberration correction in a specific direction is because an influence of the deterioration of the light intensity of the main lobe is cancelled by an increase in the light intensity of the side lobe (first diffraction ring). That is, a problem resides in that the amount of focus offset and the amount of spherical aberration correction are adjusted in a region having a track pitch which is substantially equal to a distance between the center of the main lobe and the center of the side lobe.

Under the above circumstances, according to the present invention, the amount of focus offset and the amount of spherical aberration correction are adjusted in a region having a track pitch which is sufficiently larger than the distance between the center of the main lobe and the center of the side lobe. With this implementation, an influence of an increase in the light intensity of the side lobe can be prevented.

Figure 7:
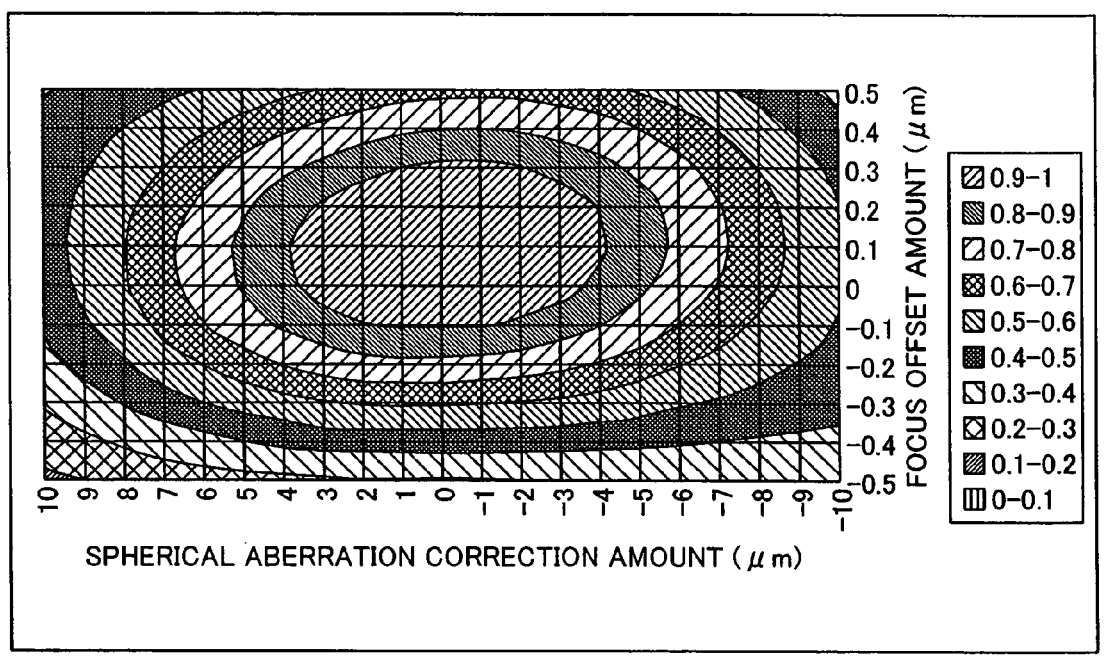
FIG. 7 is a diagram showing the contours of the tracking error signals when the amount of focus offset and the amount of spherical aberration correction are changed in a region having a tracking pitch=2 μm.

In FIG. 7, the tracking error signal amplitude is calculated while the amount of focus offset and the amount of spherical aberration correction are changed by using an optical diffraction simulator under the condition of track pitch=2 μm (>>0.35 μm), and the contours of the calculated tracking error signal amplitudes are plotted. The tracking error signal amplitude is standardized by its maximum (a value at the time when the amount of focus offset=0 and the amount of spherical aberration correction=0). The conditions other than the track pitch are identical with those in Table 1. With reference to FIG. 7, in the region having a track pitch that is sufficiently larger than the distance of from the center of the main lobe to the center of the side lobe, the tracking error signal amplitude is precipitously changed with respect to a change in the amount of focus offset and the amount of spherical aberration correction, and the contours of the tracking error signal amplitudes becomes symmetrical with respect to the respective axes of the amount of focus offset and the amount of spherical aberration correction. From this fact, the amount of focus offset and the amount of spherical aberration correction are adjusted so that the tracking error signal amplitude becomes the maximum in a region in which the track pitch is larger than the outer peripheral radius of the side lobe (the first diffraction ring), thereby making it possible to obtain the conditions under which the excellent quality of the readout signal is obtained with high precision. Also, even if the amount of focus offset and the amount of spherical aberration correction are adjusted, independently, the conditions under which the quality of the readout signal becomes the highest can be obtained surely and in a short period of time. In this example, the outer peripheral radius of the first diffraction ring is represented by the following expression (1) when it is assumed that the wavelength of the laser beam is $\lambda$, and the numerical aperture of an objective lens is NA. That is, it is desirable to adjust the amount of focus offset and the amount of spherical aberration correction in a region having the track pitch TP of an expression (2).

$$1.12 \times \lambda / NA \quad (1)$$

$$TP \geqq 1.12 \lambda / NA \quad (2)$$

It is not preferable that the track pitch is too large, and it is desirable that the track pitch is 100 μm or less, taking an objective lens driving range by the actuator when acquiring the tracking error signal amplitude into consideration.

On the contrary, it is not proper to adjust the amount of focus offset and the amount of spherical aberration correction in a region having a track pitch that is sufficiently smaller than the distance of from the center of the main lobe to the center of the side lobe. This is because a sufficient large tracking error signal amplitude cannot be obtained in that region.

From the above viewpoints, it is desirable that the track pitch TP in a region used in adjusting the amount of focus offset and the amount of spherical aberration correction satisfies the following expression (3). The region having the track pitch TP that satisfies the expression (3) is called "wide track pitch region" in the following description.

$$1.12 \times \lambda / NA \leqq TP \leqq 100\ 82\ m \quad (3)$$

(3) Adjustment of the amount of focus offset and the amount of spherical aberration correction on the basis of the rectangular waveform wobble signal envelop level:

Subsequently, a description will be given of a method of adjusting the amount of focus offset and the amount of spherical aberration correction on the basis of the rectangular waveform wobble signal amplitude.

As described above, wobble is directed to fine slide in the radius direction. In the case where the repetition frequency of the wobble is sufficiently larger than the frequency band of the tracking, because the actuator that drives the objective lens does not follow the wobble, the slide is detected as a tracking error signal. For that reason, since the wobble signal is fundamentally identical with the tracking error signal, there arises the problem described above, and the wobble signal is improper as a readout signal evaluation index used at the time of adjusting the amount of focus offset and the amount of spherical aberration correction in the region having the normal track pitch. However, the effective track pitch is different according to the combination of the fluctuation directions of the wobble of a subject track and its adjacent tracks. For that reason, a change in the wobble signal amplitude at the time of changing the amount of focus offset and the amount of spherical aberration correction is also different.

In the rectangular waveform wobble having the wavelength that is sufficiently larger than the diameter of the light spot, the combinations of the wobble fluctuation directions of the subject track and the adjacent tracks are classified into four types in FIGS. 8A to 8D. There may be symmetrical in the cases of FIGS. 8A to 8D, and the wobble signal in each of those cases is merely reversed in polarity and not changed in the absolute value. In FIG. 8, reference numeral 801 denotes a light spot, 802 is a track, and 803 is the center line of the track.

Figure 8A:
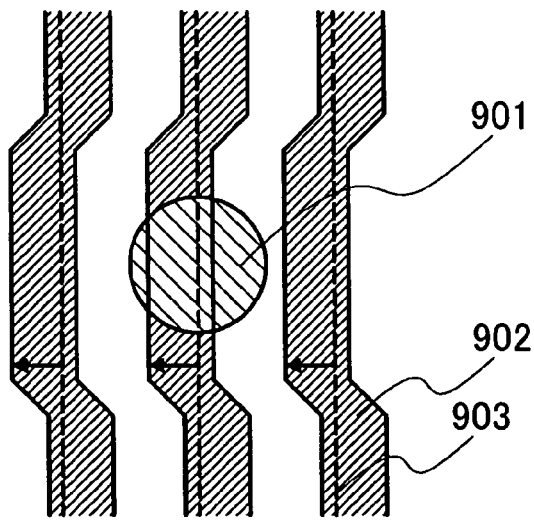
FIGS. 8A to 8D are diagrams showing the combination of the directions of deflection of rectangular waveform wobbles of a subject track and its adjacent tracks.
Figure 8B:
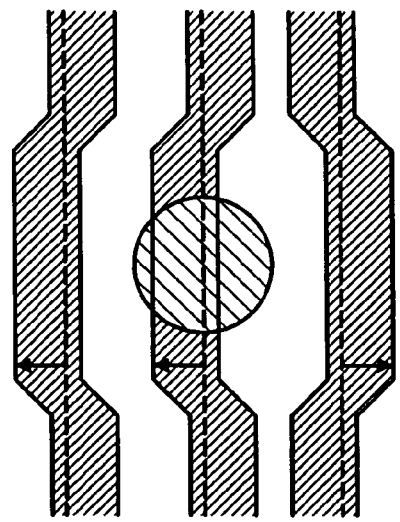
Figure 8C:
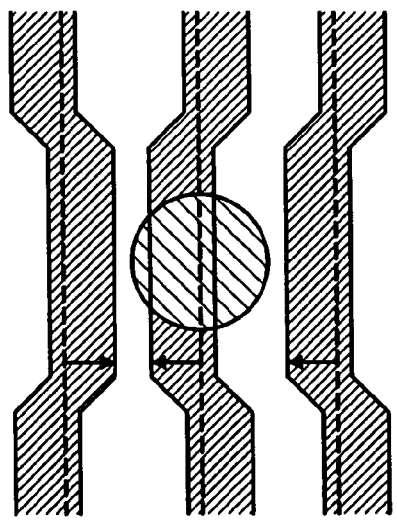
Figure 8D:
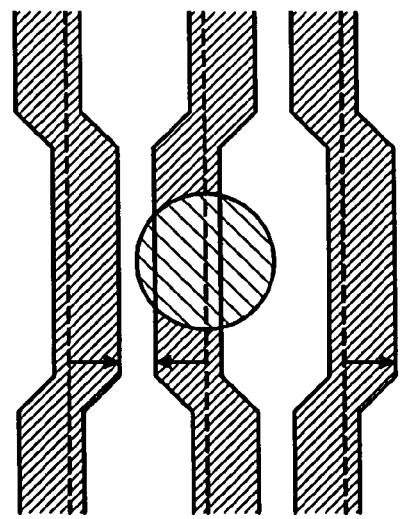
Figure 9:
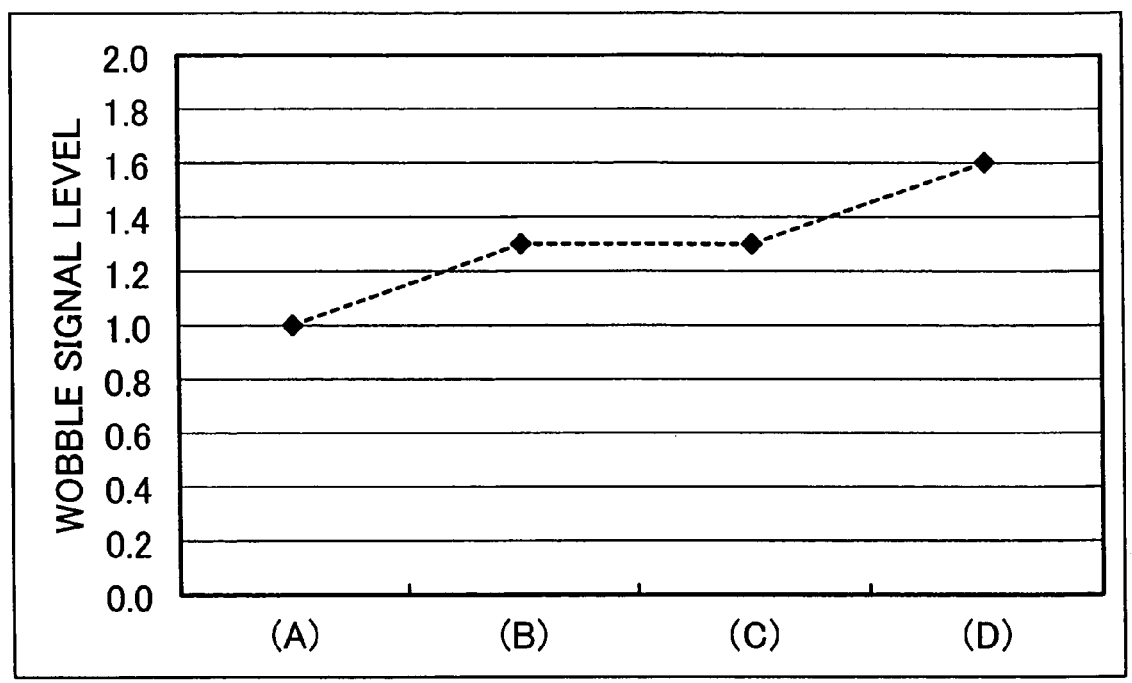
FIG. 9 is a graph showing a relationship between the combination of the directions of deflection of rectangular waveform wobbles of the subject track and the adjacent tracks, and a wobble signal level.

In FIG. 9, the wobble signal levels are calculated with respect to the respective conditions in FIGS. 8A to 8D by using the optical diffraction simulator, and then standardized by the wobble signal level in FIG. 9A and plotted. Referring to FIG. 9, three kinds of values are taken as the absolute values of the wobble signal level. In the case of FIG. 8D, it is understood that the wobble signal level becomes the maximum in the case where both of the fluctuation directions of the wobble of both the adjacent tracks are opposite to the direction of the subject track.

Figure 10:
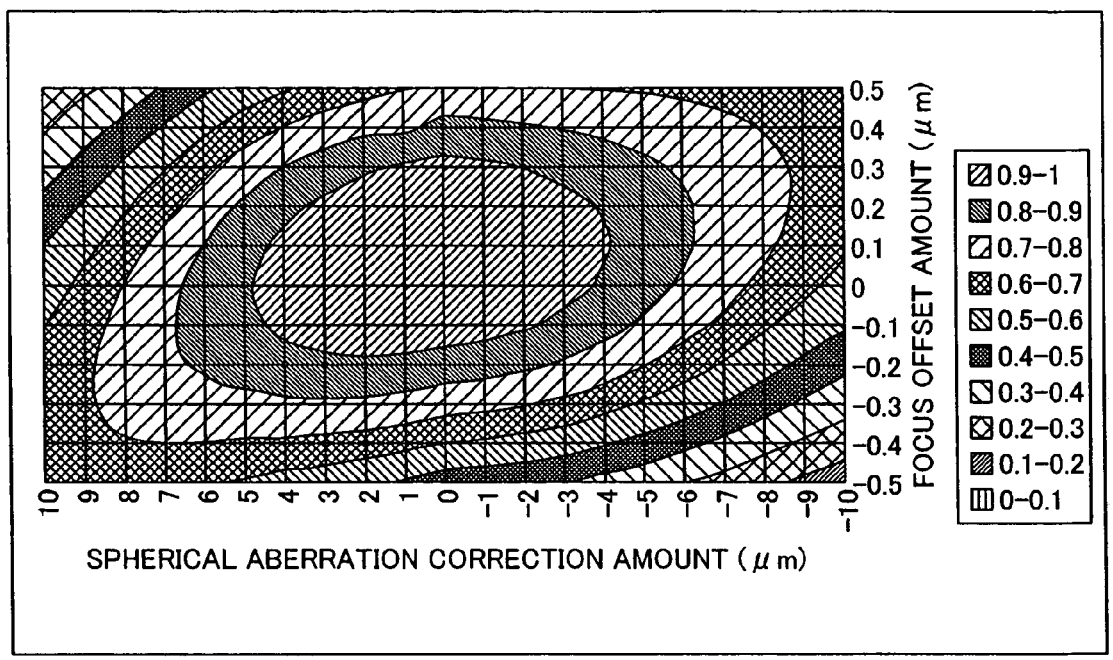
FIG. 10 is a diagram showing the contours of the rectangular waveform wobble signal envelop levels when the amount of focus offset and the amount of spherical aberration correction are changed.

In FIG. 10, the wobble signal levels are calculated while the amount of focus offset and the amount of spherical aberration correction are changed by using an optical diffraction simulator in the case of FIG. 8D, and the contours of the calculated wobble signal levels are plotted. The wobble signal level is standardized by its maximum (a value at the time when the amount of focus offset=0 and the amount of spherical aberration correction=0). The calculation conditions are the track pitch =0.35 μm, and the wobble amplitude=30 nm, and other conditions are set to be identical with the calculation conditions in Table 1.

Referring to FIG. 10, it is understood that the wobble signal level in the case of FIG. 8D is precipitously changed with respect to a change in the amount of focus offset and the amount of spherical aberration correction.

Since the wobble signal level in the case of FIG. 8D is the maximum level among three kinds of levels that can be obtained by the wobble signal, the wobble signal can be detected as the envelop level of the wobble signal.

Figure 12:
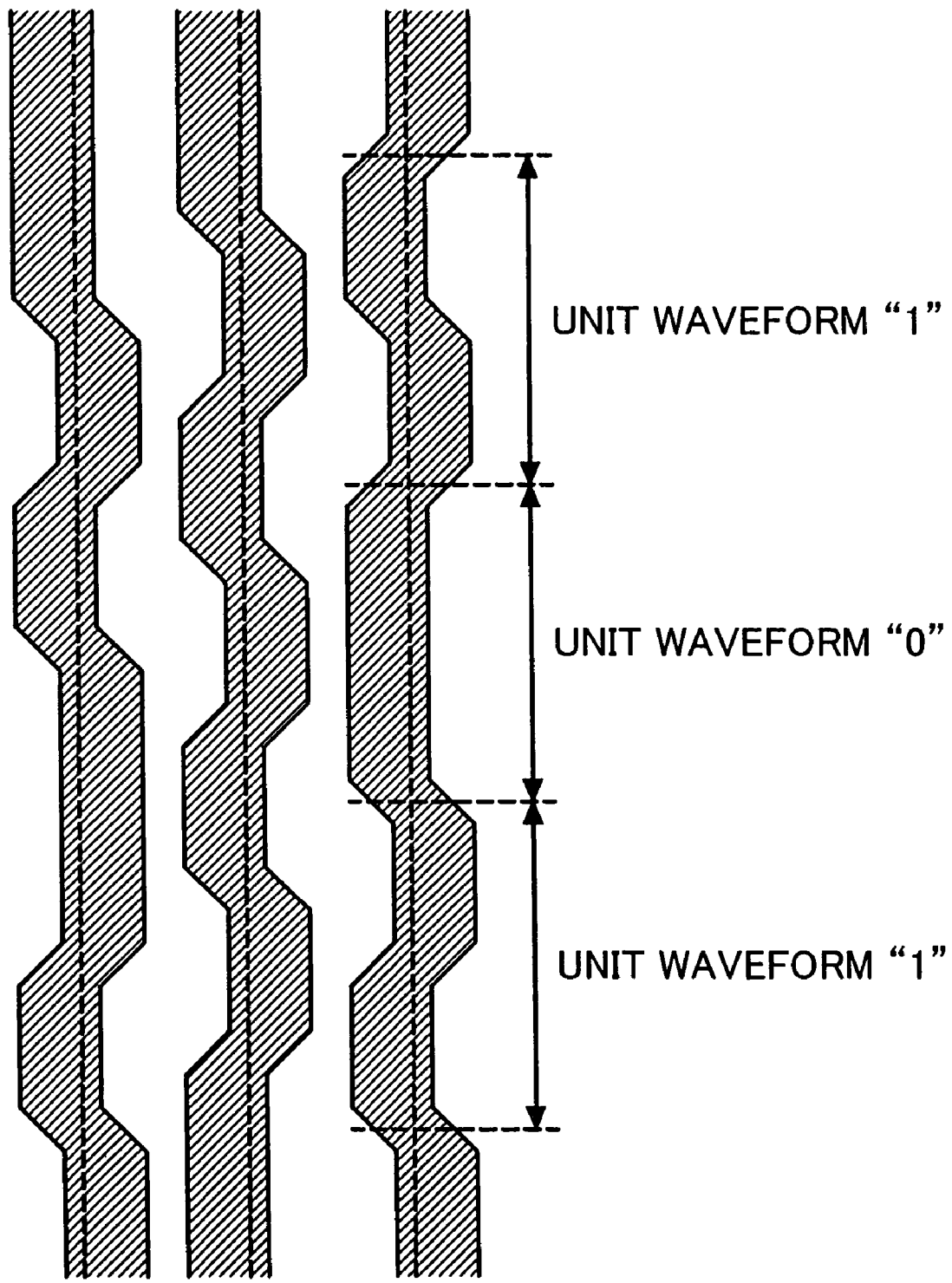
FIG. 12 is a diagram showing rectangular wave wobbles that have been modulated by bi-phase modulation.

It is desirable that the wobble configuration is not the repeated single waveform but modulated by the random modulation rule, that is, is made up of at least two kinds of unit waveforms that are different in cycle. For example, bi-phase modulation shown in FIG. 12 is desired. In the bi-phase modulation, binary data bits "0" and "1" are allocated to the unit waveform "0" and the unit waveform "1", respectively. Because the phase of the signal is shifted by 180° in correspondence with the transition of the data bit from "0" to "1" or from "1" to "0", the combination of the directions of fluctuation of the wobble of the subject track and two adjacent tracks is frequently changed with respect to the random data. For that reason, because the level of the wobble signal is frequently transited to three kinds of levels shown in FIG. 9, the envelop level can be efficiently detected. Hereinafter, the region that satisfies the above conditions is called "rectangular waveform wobble region".

Figure 1:
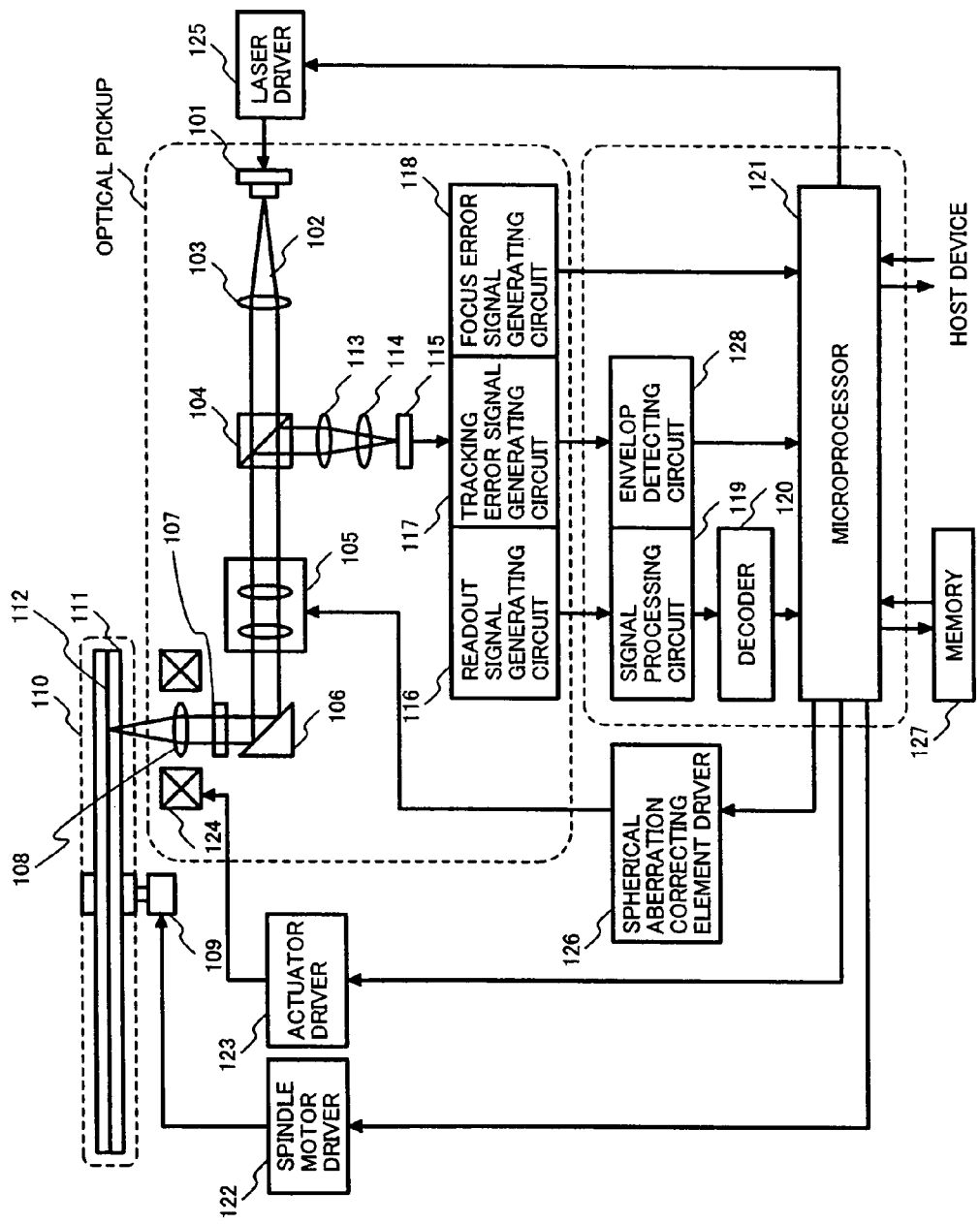
FIG. 1 is a diagram showing the structure of an information recording/reproducing apparatus according to an embodiment of the present invention.

FIG. 1 is a schematic diagram showing a structural example of an information recording/reproducing apparatus according to the present invention.

A linearly polarized laser beam 102 is outputted from a laser diode 101 and converted into a parallel pencil by a collimate lens 103. Subsequently, the laser beam 102 passes through a polarization beam splitter 104. The polarization beam splitter 104 is so arranged as to allow the laser beam 102 that has been outputted from the laser diode 101 to pass through the polarization beam splitter 104 with substantially no loss. The laser beam 102 that has passed through the polarization beam splitter 104 is added with a given spherical aberration by a spherical aberration correction element 105, and reflected by a mirror 106. Then, a course of the laser beam 102 is changed to a direction of an optical disk medium 110 that is rotationally driven by a spindle motor 109. Sequentially, the laser beam 102 passes through a quarter wave plate 107, thereby allowing its polarization state to change from a linearly polarized light to a circularly polarized light. Thereafter, the laser beam 102 is condensed by an objective lens 108, and reaches an information recording layer 112 through a cover layer 111 for protecting the information recording layer where a light spot is formed.

The information is recorded by condensing and illuminating the laser beam that has been modulated on the basis of data on the information recording layer, and changing a state of the information recording layer due to a heat which has been generated by the formed light spot. On the other hand, the reproduction of information is conducted by detecting a change in the reflectivity which is caused by the change in the state of the information recording layer. In the case of a read only optical disk, concave and convex pits are defined on the information recording layer during a disk manufacturing process in advance, and a change in the reflectivity of the light due to the concave and convex pits is detected, to thereby reproduce the information.

Figure 2:
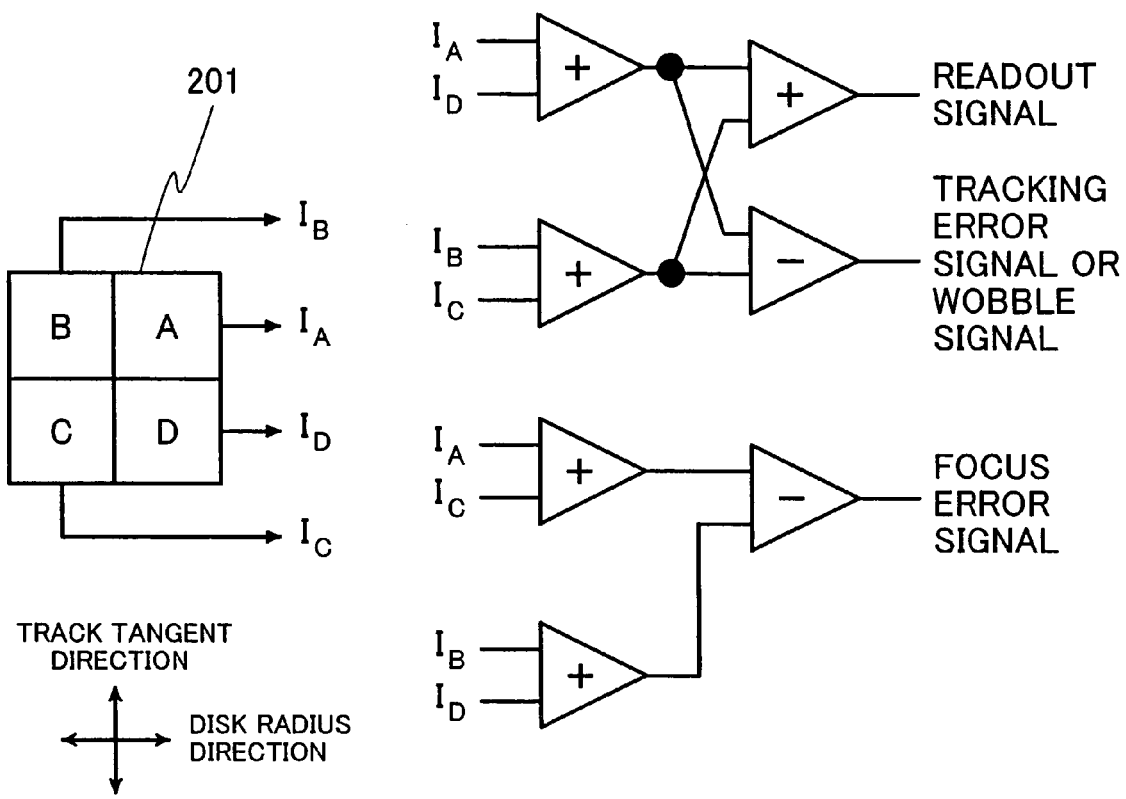
FIG. 2 is a diagram showing the structure of a photodetector and a method of producing a readout signal, a tracking error signal and a focus error signal.

The laser beam 102 that has been reflected by the information recording layer passes through the objective lens 108, and subsequently passes through the quarter wave plate 107. As a result, the laser beam 102 is again returned to the linearly polarized light, and then reflected by the mirror 106 so as to be directed to the polarization beam splitter 104. The laser beam 102 is reflected by the polarization beam splitter 104, and a course of the laser beam 102 is changed to a right angle. Sequentially, the laser beam 102 is condensed on the photodetector 115 by a detection lens 113 and a cylindrical lens 114 for detection of the focus error signal. As shown in FIG. 2, the photodetector 115 is divided into two pieces in the radius direction of the disk, and divided into two pieces in the track direction, that is, totally divided into four pieces. The respective divided photodetectors A, B, C, and D generate output signals $I_A$, $I_B$, $I_C$, and $I_D$, respectively. A readout signal, a tracking error signal, and a focus error signal are generated by a readout signal generating circuit 116, a tracking error signal generating circuit 117, and a focus error signal generating circuit 118 with the use of the above output signals according to the following arithmetic expressions.

(Readout signal)=$(I_A+I_B+I_C+I_D)$ (Tracking error signal)=$(I_A+I_D)-(I_B+I_C)$ (Focus error signal)=$(I_A+I_C)-(I_B+I_D)$ The readout signal, which is a data signal, is converted into a binary signal in a decoder 120 after the readout signal has been subjected to a signal processing such as a waveform equalization processing in a signal processing circuit 119. The binary signal is converted into data in a microprocessor 121, and then transmitted to a host device. Also, the microprocessor 121 controls a spindle motor driver 122 and controls the rotation speed of the spindle motor 109 so that the data is reproduced at a given speed.

The tracking error signal is a signal that is also called "a push pull signal" and generated by the positional displacement of the light spot in the radius direction of the disk with respect to the track, and used for tracking servo that allows the light spot to track the track. In this example, the tracking servo is conducted by the push pull method. The microprocessor 121 transmits a command to an actuator driver circuit 123 on the basis of the transmitted tracking error signal, and the actuator driver circuit 123 controls an actuator 124 on the basis of the command, and drives the objective lens 108 in the radius direction of the disk to conduct positioning.

The focus error signal is generated by the displacement of the light spot in the rotary axial direction of the disk with respect to the information recording layer 112, and used for the focus servo that allows the light spot to track the information recording layer 112. In this example, the focus servo is conducted by the astigmatism method. The microprocessor 121 transmits a command to the actuator driver circuit 123 on the basis of the transmitted focus error signal, and the actuator driver circuit 123 controls the actuator 124 on the basis of the command, and drives the objective lens 108 in the rotary axial direction of the disk to conduct positioning.

The envelop detecting circuit 128 acquires the wobble signal envelop level by using an output of the tracking error signal generating circuit 117.

In recording the data, the data that has been transmitted from the host device is encoded by the microprocessor 121 to generate the recording signal. The recording signal is transmitted to a laser driver 125, and a laser diode 101 is driven on the basis of the recording signal.

The amount of focus offset is adjusted as follows: The microprocessor 121 transmits a command to the actuator driver circuit to drive the actuator 124. The microprocessor 121 acquires the tracking error signal amplitude or the wobble signal envelop level while the amount of focus offset is sequentially changed, and then stores the tracking error signal amplitude or the wobble signal envelop level in a memory 127 together with the amount of focus offset. The amount of focus offset when the tracking error signal amplitude or the wobble signal envelop level which have been stored in the memory 127 is the maximum is applied, and set to the actuator driver circuit 123.

The amount of spherical aberration correction is adjusted as follows: The microprocessor 121 transmits a command to the spherical aberration correction element driver circuit 126 to drive the spherical aberration correction element 105. The microprocessor 121 acquires the focus error signal amplitude while the amount of spherical aberration (the amount of spherical aberration correction) which is added to the laser beam 102 is sequentially changed, and then stores the focus error signal amplitude in the memory 127 together with the amount of spherical aberration correction. The amount of spherical aberration correction when the focus error signal amplitude that has been stored in the memory 127 is the maximum is applied, and set to the spherical aberration correction element driver circuit 126.

Figure 11:
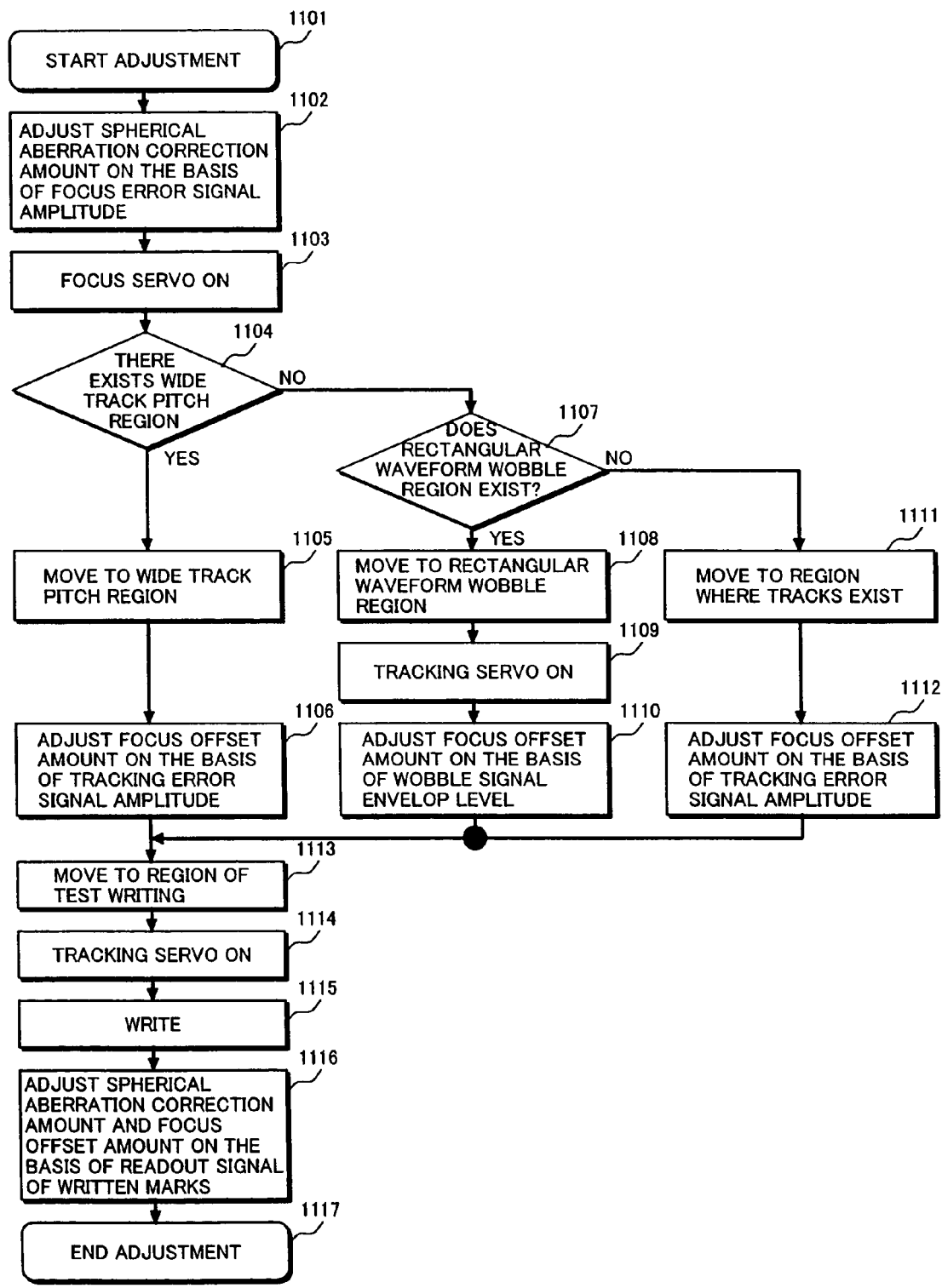
FIG. 11 is a flowchart showing a procedure of adjusting the amount of focus offset and the amount of spherical aberration correction according to the present invention.

Subsequently, a description will be given of a method of adjusting the amount of focus offset and the amount of spherical aberration correction according to this embodiment with reference to a flowchart of FIG. 11.

Step 1101: Start adjustment.

Step 1102: The amount of spherical aberration correction is adjusted on the basis of the focus error signal amplitude. In this example, the focus error signal amplitude is acquired while the amount of spherical aberration correction is sequentially changed, and the amount of spherical aberration correction such that the focus error signal amplitude becomes the maximum is applied.

Step 1103: The amount of spherical aberration correction that is applied in the step 1102 is fixed, and a focus servo is effected.

Step 1104: Subsequently, the amount of focus offset is adjusted. The focus offset is adjusted by using a method different in each of the disks. It is determined whether a wide track pitch region exists on the disk, or not. The determination can be conducted on the basis of the standard of the disk that is loaded in the driver. If the result is yes, the operation is shifted to Step 1105 whereas if the result is no, the operation is shifted to Step 1107.

Step 1105: The light spot is shifted to the wide track pitch region.

Step 1106: The amount of focus offset is adjusted on the basis of the tracking error signal amplitude. The tracking error signal amplitude is acquired while the amount of focus offset is sequentially changed, and the amount of focus offset when the tracking error signal amplitude becomes the maximum is applied.

Step 117: it is determined whether there exists a region having a rectangular waveform wobble (rectangular waveform wobble region), or not. The determination can be conducted on the basis of the standard of the disk which has been loaded in the driver. If the result is yes, the operation is shifted to Step 1108 whereas if the result is no, the operation is shifted to Step 1111.

Step 1108: The light spot is moved to the rectangular waveform wobble region.

Step 1109: The tracking servo is effected within the rectangular waveform wobble region.

Step 1110: The amount of focus offset is adjusted on the basis of the wobble signal envelop level. The wobble signal envelop level is acquired while the amount of focus offset is sequentially changed, and the amount of focus offset when the wobble signal envelop level becomes the maximum is applied.

Step 1111: The light spot is moved to a region such as a data recording region in which the track exists.

Step 1112: The amount of focus offset is adjusted on the basis of the tracking error signal amplitude. The tracking error signal amplitude is acquired while the amount of focus offset is sequentially changed, and the amount of focus offset when the tracking error signal amplitude becomes the maximum is applied.

Step 1113: The light spot is moved to a test-write region.

Step 1114: The amount of focus offset is set to the amount of focus offset that is applied in Step 1106, Step 1110, or Step 1112. The tracking serve is effected in the pre-write region.

Step 1115: Recording is implemented with a given write power. In this situation, a recording mark string in which the recording mark string is also formed in both of the adjacent tracks is prepared.

Step 1116: The amount of focus offset and the amount of spherical aberration correction are adjusted on the basis of the readout signal of the recording mark string in which the recording mark string is also formed in both of the adjacent tracks.

Step 1117: The adjustment is completed.

According to the above procedure, the amount of focus offset and the amount of spherical aberration correction can be adjusted with respect to the unrecorded disk with high precision.

In the above embodiment, the tracking servo is conducted by the push-pull method, but another method may be applied. For example, the tracking servo may be conducted by a differential push-pull method (DPP method). In this case, a diffraction grating for splitting a laser beam into a main beam and two sub-beams, that is, three beams in total is disposed in an optical path, and photodetectors for the sub-beams only are newly provided so as to acquire a push-pull signal with respect to the sub-beams. Also, tracking servo using a differential phase detection method) may be conducted with respect to a read only disk.

In the above embodiment, the focus servo is conducted by an astigmatism method, but another method may be applied. For example, the focus servo may be conducted by a knife edge method or a spot size detection method. In this case, it is necessary to newly provide a photodetector for acquiring the focus error signal.

In the above embodiment, recording is conducted in the pre-write region with a given write power after the amount of focus offset and the amount of spherical aberration correction have been adjusted. In this example, it is possible that the pre-write is conducted while the write power is changed, to thereby produce an optimum write power, and the amount of focus offset and the amount of spherical aberration correction are adjusted on the basis of the readout signal of the recording mark which has been recorded with the optimum write power.

In the above embodiment, the waveform of the wobble is rectangular, but another waveform may be applied. For example, a sine waveform may be applied. Also, the wobble modulation method is bi-phase modulation in the above embodiment, but phase modulation, amplitude modulation or frequency modulation may be applied. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An information recording/reproducing apparatus, comprising:
    an optical disk driver unit that holds and rotationally drives an optical disk;
    a laser source;
    a spherical aberration correction unit that adds the spherical aberration of a variable to a laser beam that is generated from the laser source;
    an objective lens that converges the laser beam added with the spherical aberration on the optical disk that is rotationally held by the optical disk driving section;
    a photodetector that receives the laser beam that is reflected by the optical disk;
    a focus error signal generator unit that generates a focus error signal from an output of the photodetector;
    a tracking error signal generator unit that generates a tracking error signal from the output of the photodetector;
    an actuator that drives the objective lens in a disk rotational axial direction; and
    a control unit that receives the focus error signal and the tracking error signal, and controls the amount of spherical aberration added by the spherical aberration correction unit and the amount of driving by the actuator,
    wherein the control unit controls the spherical aberration correction unit and the actuator so that the amplitude of the tracking error signal becomes maximum in a wide track pitch region having a track pitch TP that satisfies the following expression when it is assumed that a wavelength of the laser beam is $\lambda$ and a numerical aperture of the objective lens is NA:

$$1.12 \times \lambda/NA \leq TP \leq 100 \ \mu m.$$

2. The information recording/reproducing apparatus according to claim 1, wherein an unrecorded disk in which no data is recorded is used as an optical disk.

3. An information recording/reproducing apparatus, comprising:
- an optical disk driver unit that holds and rotationally drives an optical disk;
- a laser source;
- a spherical aberration correction unit that adds the spherical aberration of a variable to a laser beam that is generated from the laser source;
- an objective lens that converges the laser beam added with the spherical aberration on the optical disk that is rotationally held by the optical disk driving section;
- a photodetector that receives the laser beam that is reflected by the optical disk;
- a focus error signal generator unit that generates a focus error signal from an output of the photodetector;
- a tracking error signal generator unit that generates a tracking error signal from the output of the photodetector;
- an envelop detector unit that detects an envelop level of a wobble signal included in the tracking error signal;
- an actuator that drives the objective lens in a disk rotational axial direction; and
- a control unit that receives the focus error signal and the tracking error signal, and controls the amount of spherical aberration added by the spherical aberration correction unit and the amount of driving by the actuator,
- wherein the control unit controls the spherical aberration correction unit and the actuator so that an envelop level of the wobble signal becomes maximum in a rectangular waveform wobble region where a configuration of the wobble is shaped in a rectangular wave.

4. The information recording/reproducing apparatus according to claim 3, wherein an unrecorded disk in which no data is recorded is used as an optical disk.

5. The information recording/reproducing apparatus according to claim 3, wherein the wobble comprises at least two kinds of unit waveforms, and one of the unit waveforms has a cycle different from that of the other unit waveform.

* * * * *